United States Patent
McGavic et al.

[11] 3,805,331
[45] Apr. 23, 1974

[54] FISH FILLETING DEVICE

[76] Inventors: Jewel M. McGavic, 1072 Brownlee St., Memphis, Tenn.; Claude E. McGavic, Jr., 2300 Sheriff Rd., College Park, Ga.

[22] Filed: June 12, 1972

[21] Appl. No.: 261,689

[52] U.S. Cl. .................................................. 17/70
[51] Int. Cl. ............................................ A22c 25/00
[58] Field of Search ..................... 17/56, 44, 66, 70

[56] References Cited
UNITED STATES PATENTS
2,686,334  8/1954  Miller .................................... 17/70
2,980,948  4/1961  McCain ................................. 17/70
3,500,495  3/1970  Morse .................................... 17/70

Primary Examiner—Hugh R. Chamblee
Assistant Examiner—D. L. Weinhold
Attorney, Agent, or Firm—Browdy and Neimark

[57] ABSTRACT

A fish filleting and cleaning device includes a clamp which is hinged at one end about a pivot pin which is suitably anchored to a support. A handle comprising two rocker arms which have a pivot point intermediate their ends is attached, one arm to each jaw of the clamp. The handle is spring biased to maintain the clamp in a closed position. The clamp may be rotated 180° about the pivot pin.

9 Claims, 4 Drawing Figures

PATENTED APR 23 1974 3,805,331

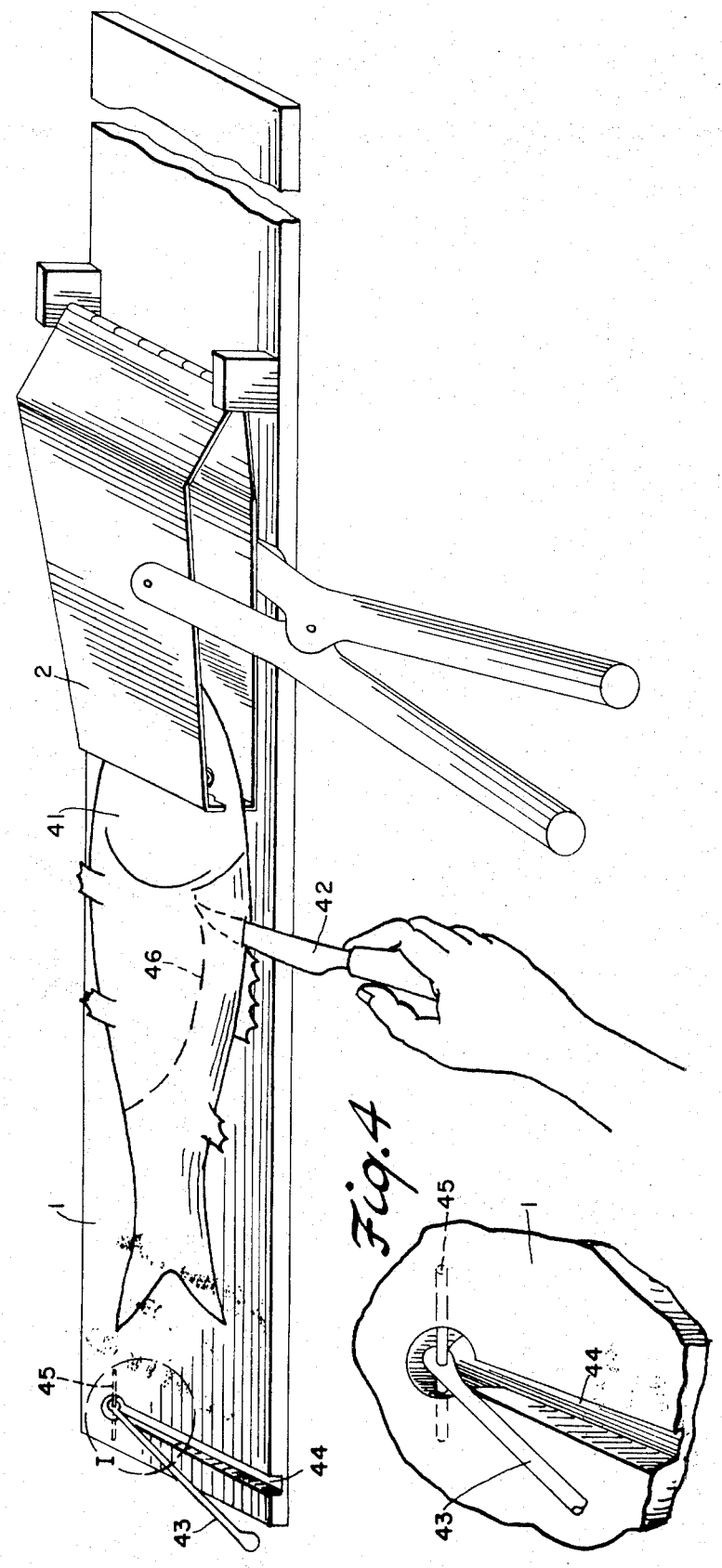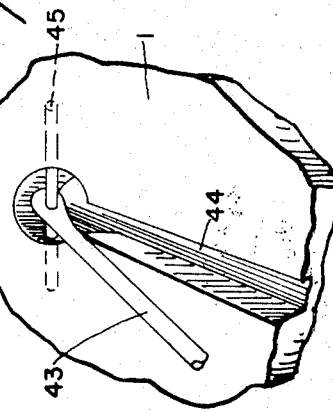

3,805,331

FISH FILLETING DEVICE

SPECIFICATION

1. Field of Invention

The present invention relates to an improved fish filleting and cleaning device, and, more particularly, to a board with a pivotable clamp so that fish may be filleted and cleaned with minimum contact with the hands.

2. Background of the Invention

When cleaning and filleting fish it is necessary to hold the fish in a stationary position while the work is being performed on it. For this purpose, various clamping devices have been devised, the most common comprising a simple board having a clamp at one end for receiving the tail of the fish. The fish may then be decapitated, cleaned and scaled. In such a device it is necessary, however, to remove the half cleaned fish from the clamp, turn it over, and turn the board around 180° so that the backbone is placed facing the person filleting the fish.

U.S. Pat. No. 1,418,595 shows a fish cleaning board with a pivotable holder. The tail is engaged by the holder and the fish is held in a position parallel to the pivot pin. When the holder is pivoted, the fish is flipped, but the backbone is now facing away from the person cleaning the fish and the fish is at a greater distance from him, a clear disadvantage.

The fish holding clamp in U.S. Pat. No. 2,686,334 engages the tail of the fish, but the entire clamp must be removed in order to flip the fish over and, once again, the backbone is then facing away from the person cleaning the fish.

SUMMARY OF THE INVENTION

It is, accordingly, an object of the present invention to overcome the deficiencies of the prior art, such as indicated above.

It is another object of the present invention to provide for simplified fish filleting and cleaning.

It is another object of the present invention to provide a simple and economical fish filleting and cleaning device.

It is still another object of the present invention to provide a fish clamping board which permits the completion of the fish filleting process without removing the fish from the clamp and without the necessity of rotating the board in a horizontal plane.

It is yet another object of the present invention to provide a fish holder with which a complete fillet can be removed from the fish without ever being touched by human hands.

A further object of the invention is to provide a fish filleting and cleaning board with which a fish may be cleaned and filleted without opening the abdomen or removing the head from the backbone.

A still further object of the invention is to provide a fish clamp for filleting and cleaning which is easily portable and may be attached to any board or table.

The structure comprises a base plate and a pivotable clamp with a handle. A flush mounted holding bar may be positioned at one end of the base plate. The invention allows one to complete an entire fish filleting and visceral cleaning process without touching the fish by hand and without disengaging the fish from the clamp. Further, the filleted and cleaned pieces may be simply and easily deskined without removing the pieces from the base plate.

BRIEF DESCRIPTION OF THE DRAWINGS

Other objects of the present invention will become apparent upon reading the following description of preferred embodiments and referring to the accompanying drawing in which:

FIG. 3 is a perspective view showing the clamp of FIG. 1 in operation and further showing a holding bar mounted on the cleaning board for use in the fish cleaning process;

FIG. 4 is an enlarged cut-away portion of area I of FIG. 3 showing details of the flush mounted holding bar.

DESCRIPTION OF THE PREFERRED EMBODIMENTS

Figure 1:
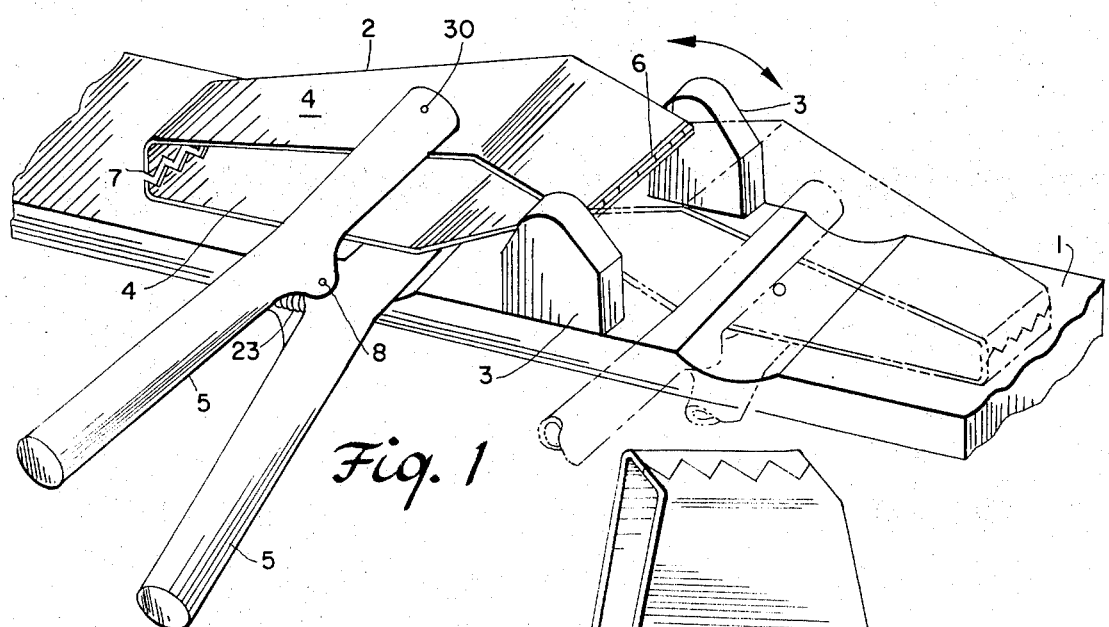
FIG. 1 is a perspective view showing the clamp permanently affixed to a cleaning board and wherein the broken lines indicate the pivotability of the clamp.

Referring now to FIG. 1, there is shown a fish filleting and cleaning board comprising a base board 1 of dimensions sufficient to support a fish holding clamp 2 at the middle thereof and a fish held longitudinally thereby, such that the board will be of a length substantially twice that of the maximum sized fish that the clamp 2 can hold and a width substantially the same as the width of such maximum sized fish. The board may be formed of any suitable material such as wood.

Mounted centrally and on adjacent sides of base board 1 are upward projecting clamp supports 3. The upward projecting clamp supports 3 receive and secure a pivot pin or hinge 6 of the fish holding clamp 2. The fish holding clamp 2, preferably of metal or the like, comprises complementary shaped jaws 4 hinged at one end around the pivot pin or hinge 6. The fish-engaging forward ends of the clamp jaws 4 are provided with interfitting teeth 7 for securely holding the head of a fish.

Attached to the outer surfaces of the jaws 4 are the ends of rocker arms 5, 5 of a handle 21 so that each arm 5 has its end attached to one of the jaws 4. The handle 21 should be pivotably attached to the jaws 4 at the ends of the arms 5 such as by a loose fitting pin 30 so that they may be comfortably handled by either the right or left hand and so that movement is permitted between the jaws 4 and arms 5 during opening of the jaws. Each rocker arm 5 has apertured hinge tap portions 20 at either side intermediate their ends. The rocker arms 5 are mutually pivoted through an aligned aperture 22 of tabs 20 upon a pintle 8. A spring 23 is coiled around the pintle 8 and so arranged to urge the ends of the handle 21 attached to jaws 4 to a closed position and the handle ends of rocker arms 5 to an open position.

Figure 2:
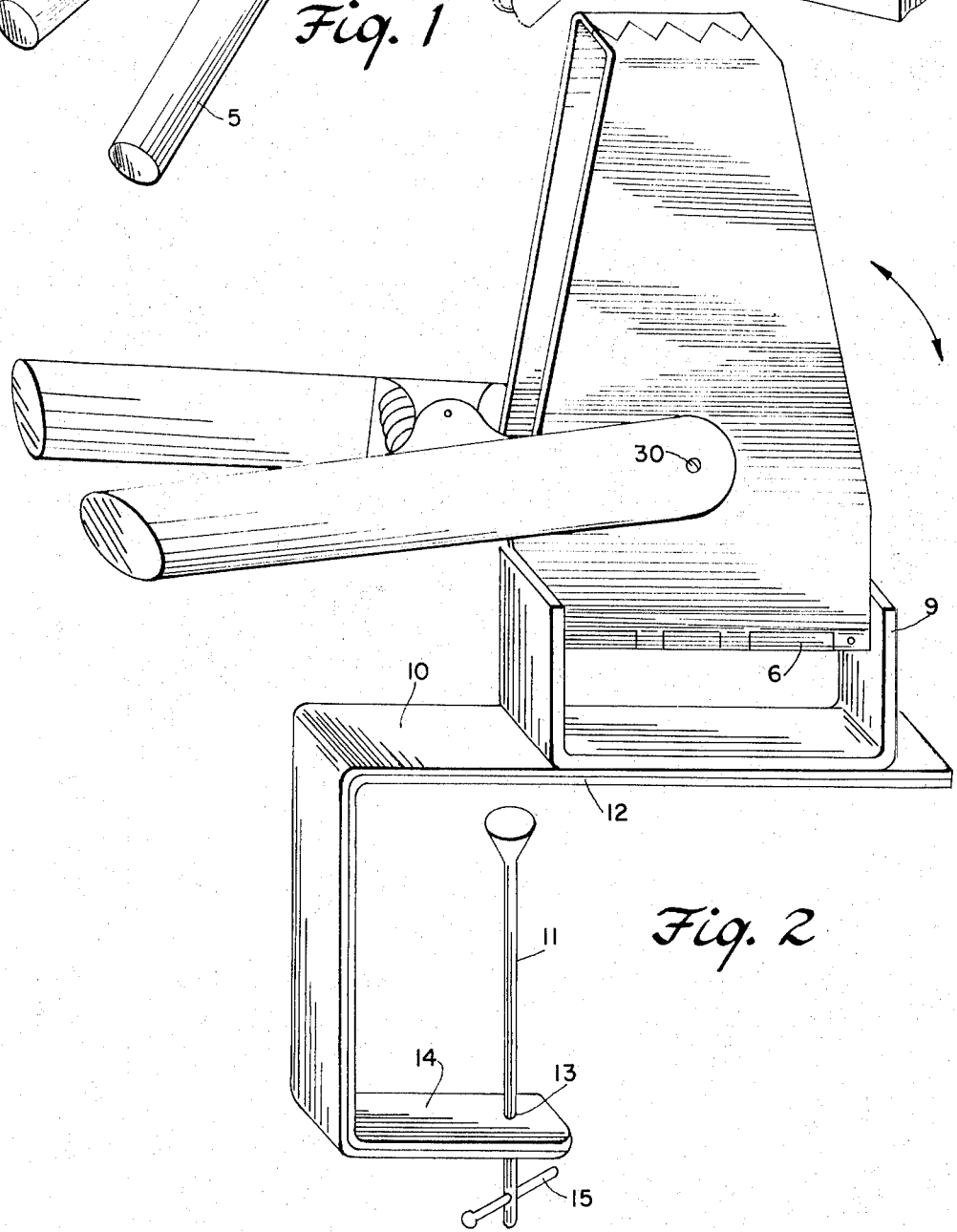
FIG. 2 is a perspective view showing the fish holding clamp affixed to a C clamp for removable attachment to a suitable board.

In the modification shown in FIG. 2, the clamp 2 may be adapted for removable connection to a support for easier portability. In this embodiment, the pivot pin or hinge 6 of the clamp 2 is supported by the vertical sides of a U-shaped member 9, which is in turn affixed to the upper arm 12 of a conventional C-clamp 10 or the like. The C-clamp 10 may then be attached to a suitable support member, such as a board or a table, at the situs of use by means of a screw 11 threadedly engaged through a threaded aperture 13 in the bottom arm 14 of the C-clamp 10.

The C-clamp 10 is placed over the edge of the support surface and is secured thereto by tightening the screw 11 by means of a lever 15 attached to the end thereof. In this manner the C-clamp may be readily affixed to a variety of supporting surfaces having different thicknesses. Once the C-clamp 10 is securely attached to the support member, the operation of the device is identical to that of FIG. 1.

FIGS. 3 and 4 illustrate the operation of the clamp as well as an additional embodiment comprising a holding bar 43. At a position near one end of the base board 1 a holding bar 43 may be mounted. A holding bar hinge pin 45 is inserted into the base board 1 intermediate its horizontal surfaces. A portion of the board 1 is cut away as at 44 in order that the holding bar 43 may be flush mounted when closed. The holding bar 43 is pivotably mounted on the hinge pin 45.

The operation of the fish filleting device will now be described. The clamp jaws 4, 4 may be opened by gripping the handle 21 and squeezing the handle end portions of the rocker arms 5, 5 together against the action of the spring 23. As the jaws 4 open, the arms 5 move in relation thereto, the loose fitting pin 30 maintaining each arm 5 and its associated jaw 4 together. The head of a fish 41 may then be inserted, with tongs, for example, into the pen jaws 4,4 of the clamp 2 as seen in FIG. 3.

When the clamp is in the position shown by FIG. 3 and by the sold lines of FIG. 1, an incision is made, preferably by a good filleting knife 42, behind the gill and just above the backbone. The knife 42 is then passed down the backbone wtth the tip of the knife extending no further than the rib cage as indicated by dotted line 46. Care must be taken not to penetrate the rib cage. When the knife clears the rib cage the knife is passed through the fish and moved to the tail. The cut fillet is then lifted and the knife is worked along the rib cage until all the meat is removed. The fillet is then removed and set aside.

The clamp 2 and the remainder of the fish 41 is then pivoted 180° by means of the handle 21 to the position indicated by broken lines in FIG. 1. The fillet is then removed from the second side of the fish in an identical manner as described above.

All that now remains of the fish 41 in the clamp 2 are the head, bones and viscera. This may now be discarded. The fillet which has been removed is now placed scale side down onto the board 1 with its tail under holding bar 43. While holding bar 43 is being held down with one hand, the fillet knife is worked across the bar 43 and between the meat and the skin. In this manner the meat is removed from the skin and a cleaned and filleted piece of fish is ready for cooking or storage.

In embodiments of the present invention without the flush mounted holding bar 43, the meat may be held down by other means such as a knife, fork or icepick. It can be seen that when using the device of the present invention, fish may be cleaned and filleted quickly, cleanly, and extremely easily there being only minimal contact of the fish with the hands.

All of the parts of the present invention, except for the wooden board 1, are preferably constructed of metal such as steel or stainless steel. Any suitable material, however, such as a hard plastic, may be substituted therefor and still be within the contemplation of the present invention. While the pivot pin and hinge 6 are the same in the illustrated embodiments, it will be understood that separate elements may be used if desired. Furthermore, other modifications and changes may be made without departing from the present invention.

What is claimed is:

1. A fish filleting device, comprising:
    clamp means for tightly holding the head portion of a fish, said clamp means comprising two complementary elongated jaws having corresponding gripping means at one end thereof and hinge means at the other end thereof for hingedly connecting said elongated jaws together;
    pivot pin means including a pivot pin at said hinge means end of said jaws for allowing rotation of said clamp means 180° about a horizontal axis perpendicular to the longitudinal axis of said clamp means;
    support means, connected to said clamp means by said pivot pin means, for anchoring said clamp means to a flat surface; and
    handle means attached to a face of each of said jaws for opening and closing said clamp means and rotating said clamp means about said pivot pin, said handle means comprising complementary rockers having corresponding clamping ends and handle ends, said rockers being mutually pivoted at a point intermediate their ends and each of said rockers being connected at the clamping ends thereof to a corresponding jaw of said clamp means at points intermediate the ends of said jaws.

2. A fish filleting device in accordance with claim 1 wherein said handle means further includes:
    spring means connected to said rockers for urging said clamping ends together and said handle ends apart.

3. A fish filleting device in accordance with claim 2 wherein said handle means are pivotably connected to said clamp means.

4. A fish filleting device in accordance with claim 1, further comprising a support board and wherein said support means comprises:
    pivot pin supports fixedly connected to said board for supporting said pivot pin.

5. A fish filleting device in accordance with claim 1, wherein said support means comprises:
    a C-clamp; and
    pivot pin supports fixedly connected to said C-clamp for supporting said pivot pin.

6. A fish filleting device in accordance with claim 1, wherein said gripping ends of said jaws further include a plurality of interfitting teeth projecting therefrom.

7. A fish filleting device in accordance with claim 1 wherein said hinge means include a hinge pin, and wherein said hinge pin is said pivot pin.

8. A fish filleting device, in accordance with claim 4 wherein:
    said support board further includes a holding bar pivotably mounted on said support board.

9. A fish filleting device in accordance with claim 8 wherein:
    said holding bar is flush mounted on said support board such that when said holding bar is in a closed position the surface of said support board therearound is flat.

* * * * *